United States Patent [19]

Steck et al.

[11] Patent Number: 4,495,246

[45] Date of Patent: Jan. 22, 1985

[54] ACICULAR FERROMAGNETIC CHROMIUM DIOXIDE PARTICLES

[75] Inventors: Werner Steck, Ludwigshafen; Jenoe Kovacs, Hessheim; Norbert Mueller, Friedelsheim; Helmut Jakusch, Frankenthal, all of Fed. Rep. of Germany

[73] Assignee: BASF Aktiengesellschaft, Fed. Rep. of Germany

[21] Appl. No.: 545,938

[22] Filed: Oct. 27, 1983

[51] Int. Cl.³ .............................................. H01F 10/02
[52] U.S. Cl. .................................... 428/403; 427/127; 428/694; 428/900
[58] Field of Search ............... 427/127; 428/403, 694, 428/900

[56] References Cited

U.S. PATENT DOCUMENTS

| | | | |
|---|---|---|---|
| 2,885,365 | 5/1959 | Oppegard | 252/62.5 |
| 2,923,683 | 2/1960 | Ingraham et al. | 252/62.5 |
| 2,923,684 | 2/1960 | Ingraham | 252/62.5 |
| 3,034,988 | 5/1962 | Ingraham et al. | 252/62.5 |
| 3,278,263 | 10/1966 | Cox | 23/145 |
| 3,451,771 | 6/1969 | Cox et al. | 23/145 |
| 3,529,930 | 9/1970 | Bottjer | 23/145 |
| 3,686,031 | 8/1972 | Balthis, Jr. | 117/234 |
| 3,687,726 | 8/1972 | Pye | 117/234 |
| 3,958,068 | 5/1976 | Umeki | 428/403 |
| 3,986,205 | 10/1976 | Fayling | 360/2 |
| 3,986,206 | 10/1976 | Fayling | 360/2 |
| 4,045,544 | 8/1977 | Williston et al. | 423/607 |
| 4,281,043 | 7/1981 | Deffeyes | 428/457 |

FOREIGN PATENT DOCUMENTS 0078042 10/1982 European Pat. Off.
1270538 7/1961 Fed. Rep. of Germany.

OTHER PUBLICATIONS

H. Fikentscher, Cellulose-Chemie 30 (1931), 58 et seq.

Primary Examiner—Bernard D. Pianalto
Attorney, Agent, or Firm—Keil & Weinkauf

[57] ABSTRACT

Acicular ferromagnetic chromium dioxide particles having a pH greater than 4 and a process for their preparation.

4 Claims, No Drawings

ACICULAR FERROMAGNETIC CHROMIUM DIOXIDE PARTICLES

The present invention relates to acicular ferromagnetic chromium dioxide particles which have a pH greater than 4, and to a process for their preparation.

The preparation of acicular ferromagnetic chromium dioxide and the use of this material for magnetic recording media has been described in a large number of publications. Magnetic recording media containing chromium dioxide generally possess better magnetic properties than those based on other magnetic oxides.

It has also been proposed that ferromagnetic chromium dioxide mixed with other magnetic materials be used for magnetic storage media. For example, mixtures of chromium dioxide with other magnetic materials of very high coercive force, which are suitable for magnetic layers on credit cards and other identity cards, have been described (U.S. Pat. Nos. 3,986,205, 3,986,206 and 4,281,043, etc.). Chromium dioxide mixtures are also known to be used for conventional magnetic recording media, in particular for video tapes. This applies particularly to mixtures of chromium dioxide with conventional magnetic iron oxides, as disclosed in German Pat. No. 1,955,699.

However, it has also been disclosed that the magnetic properties of recording media containing nonstabilized chromium dioxide deteriorate in the course of time. Ferromagnetic chromium dioxide in powder form is substantially stable in the absence of moisture; furthermore, no change in magnetic properties is detectable over a long period of time. However, it has been observed that chromium dioxide is attacked by both water and other materials, for example the organic polymer binders used in the preparation of magnetic recording media, resulting in decomposition to give non-magnetic constituents. In the case of magnetic recording media, this brings about a deterioration in the magnetic and therefore the electroacoustic properties, and also has an adverse effect on the mechanical properties. This deterioration is furthermore accelerated at relatively high temperatures. The cause of this is thought to be the oxidative effect of chromium(VI) ions, which either adhere to the chromium dioxide as a result of the preparation process or are formed during the disproportionation of the chromium dioxide.

There has therefore been no lack of attempts to overcome these disadvantages. For example, U.S. Pat. No. 3,512,930 describes the treatment of chromium dioxide powder with a reducing agent. In this manner, a protective layer of stable chromium(III) compounds is produced at the surface. In other processes, an aluminum oxide coating (U.S. Pat. No. 3,687,726) or a coating of a sparingly soluble metal phosphate (U.S. Pat. No. 3,686,031) is produced. The application of metal compounds whose cations are capable of forming sparingly soluble chromates has also been disclosed. Japanese Preliminary Published Application No. 21200/76 proposes coating the chromium dioxide particles by applying magnetic iron oxides to the surface, while German Laid-Open Application DOS No. 2,749,757 describes the application of iron(III)-containing oxidic precipitates to the chromium dioxide.

Even though it is possible to impart more or less satisfactory stability to the chromium dioxide by means of the above measures, the conventional process for the preparation of the chromium dioxide results in a strongly acidic material, and this constitutes a serious disadvantage particularly if this chromium dioxide is to be incorporated, together with conventional alkaline or neutral magnetic materials or other fillers, into a binder for the production of a magnetic dispersion.

The present invention relates to acicular ferromagnetic chromium dioxide particles whose surface has been treated in the aqueous phase with an inorganic reducing agent, wherein the filtrate obtained when an aqueous suspension of these particles is heated to 100° C., cooled to room temperature and then filtered has a pH greater than 4.

The improved particles are prepared by a process wherein acicular ferromagnetic chromium dioxide particles are suspended in water, an aqueous solution of an alkali metal sulfite or bisulfite and an aqueous solution of an iron(II) salt are added at from 10° to 70° C. and the solid is separated off from the water, washed with water and dried at below 130° C.

In this procedure, it has been found to be advantageous if the suspension of the chromium dioxide particles is brought to pH 4–11 with an aqueous base.

In a particularly advantageous embodiment of the novel process, drying is carried out in an inert gas atmosphere, usually nitrogen, at below 100° C.

For the purposes of the present invention, any ferromagnetic chromium dioxide prepared in a conventional manner can be employed, but one which is modified with other ions is preferred. Suitable chromium dioxides have a coercive force greater than 15 kA/m and a specific remanence greater than 25 n/Tm$^3$/g. Their preparation is described in U.S. Pat. Nos. 2,885,365, 2,923,683, 2,923,684, 3,034,988, 3,278,263, 3,451,771, 3,529,930 and 4,045,544 and in German Laid-Open Applications DOS No. 2,022,820, DOS No. 2,942,646, DOS No. 2,001,383, DOS No. 1,802,469, DOS No. 2,520,030 and DOS No. 2,648,305.

The chromium dioxides prepared by prior art methods all have a pH less than 4. To determine the pH, 5 g of chromium dioxide are suspended in 50 ml of distilled water, and the suspension is heated to 100° C. in the course of 10 minutes. It is then cooled to room temperature, the chromium dioxide is filtered off and the pH of the filtrate is measured by means of a combination pH electrode, eg. a Schott H 65 type electrode, at 22° C.

The novel acicular ferromagnetic chromium dioxide then has a pH greater than 4. It is prepared by suspending the chromium dioxide in water, the weight ratio of the latter to the former being advantageously from 5:1 to 30:1, in particular from 8:1 to 20:1, and introducing the aqueous solutions of the reducing agent and of the iron(II) salt into the stirred suspension. The reducing agent used is an alkali metal sulfite or bisulfite, in particular sodium sulfite or sodium bisulfite, or a mixture of sodium hydroxide and sulfur dioxide in the ratio corresponding to the chemical composition of sodium sulfite. Suitable iron(II) salts are the chloride and the sulfate. The solution of the reducing agent and that of the iron-(II) salt can be added either simultaneously or in any desired sequence. The reaction of the chromium dioxide with the reducing agent and the iron(II) is carried out at from 10° to 70° C., preferably from 15° to 50° C.

In a preferred embodiment of the novel process, the pH is brought to the desired value with another, aqueous solution of a base, in particular of an alkali metal hydroxide, during the addition of the reducing agent and/or the Fe(II) salt. Thus, the pH of the aqueous suspensions of chromium dioxide and the reducing agent and/or the Fe(II) salt should not, as a rule, fall below 4.5. Where the pH of the suspension would fall below 4.5, for example where a relatively large amount of Fe(II) salt is used, it is prevented from falling below this pH limit by means of aqueous alkali, and, after the addition of the Fe(II) salt is complete, the pH of the suspension is again increased by means of a base, preferably to above 7.

After the reaction of the chromium dioxide, the resulting solid is separated off from the water, washed with water and then dried. During drying, which can be carried out in the air or in the presence of oxygen and/or an inert gas, eg. nitrogen, the product temperature must not exceed 130° C., preferably 100° C.

The resulting novel chromium dioxide is characterized by its pH but must in addition possess magnetic properties which permit its use as a magnetic material in the production of magnetic recording media. The magnetic properties were determined in a magnetic field of 160 kA/m, using a conventional vibrating sample magnetometer. The coercive force ($H_c$) of the magnetic pigment (tamped density $\rho = 1.3$ g/m$^3$) is given in kA/m, and the specific remanence (Mr/$\rho$) and the specific magnetization (Mm/$\rho$) are given in nTm$^3$/g.

If the novel chromium dioxide is used in admixture with one or more other magnetic pigments having a pH greater than 4 (measured by the above method), suitable magnetic pigments are all those which, as a result of their preparation process, possess such a pH. Examples of such magnetic pigments are the ferrimagnetic oxides $\gamma$—Fe$_2$O$_3$ and Fe$_3$O$_4$, and magnetic FeO$_x$ pigments where x is from 1.33 to 1.5. These can be obtained as intermediates, for example via an $\alpha$—FeOOH (goethite) prepared by the alkaline process (German Published Applications DAS No. 1,204,644, DAS No. 2,550,225, DAS No. 2,550,307 and DAS No. 2,550,308 and German Laid-Open Application DOS No. 2,254,810). FeO$_x$ pigments where x is from 1.33 to 1.5, which are doped with other ions and can be modified throughout the entire particle and/or surface-modified, are also very suitable for the mixture. Cobalt-modified pigments which are either doped throughout the particle or surface-doped are particularly preferred. Preparation processes for these pigments are known.

Finely divided ferromagnetic pigments of the metals Fe, Co and Ni or their alloys are also suitable for the mixture.

Another class of suitable magnetic pigments of this type comprises hexagonal ferrites, eg. BaFe$_{12}$O$_{19}$; Ba(Me, Ti)$_x$Fe$_{12-2x}$O$_{19}$ where Me is Zn or Co; Ba$_4$Me$_2$Fe$_{36}$O$_{60}$ where Me is Fe or Zn; BaMe$_2$Fe$_{16}$O$_{27}$ where Me is Fe, Zn, Co or Ni; Ba$_2$Me$_2$Fe$_{28}$O$_{46}$ where Me is Fe or Zn; Ba$_2$Me$_2$Fe$_{12}$O$_{22}$ where Me is Zn, Cu or Cd and Ba$_3$Me$_2$Fe$_{24}$O$_{41}$ where Me is Fe or Zn. These compounds may contain strontium ions instead of barium ions. These magnetic pigments can be prepared by the hydrothermal or ceramic processes, which have long been known. The more recent flux processes also give suitable hexagonal ferrites.

Other compounds which are very suitable for the mixture are the conventional ferrimagnetic spinels Me(II)O.Fe$_2$O$_3$ where Me(II) is Mn, Ni, Cu, Co, Mg, Fe or Zn, the zinc being used in conjunction with one or more of the aforementioned ions. The preparation processes are known.

Provided that these substances, as obtained in their preparation processes, have a pH greater than 4, they can be particularly advantageously used, in admixture with the novel chromium dioxide, for the preparation of magnetic recording media.

Non-magnetic fillers are frequently added to improve, in general, the mechanical properties of the recording medium of the magnetic layer, and fillers of this type which are suitable for mixing with the novel chromium dioxide are the commercial oxides, eg. Cr$_2$O$_3$, $\alpha$-Fe$_2$O$_3$ or Al$_2$O$_3$, or, for example, a mixture of quartz with kaolinite. These have a pH of from 6 to 8.

The novel chromium dioxide powder is processed into a dispersion in a conventional manner together with the desired finely divided magnetic or non-magnetic components of the mixture and a binder, as well as suitable dispersants, lubricants and other conventional additives.

Suitable polymer binders are those which are conventionally used for such purposes, eg. vinyl chloride copolymers, acrylate copolymers, polyvinylacetals, such as polyvinylformal or polyvinylbutyral, high molecular weight epoxy resins, polyurethanes and mixtures of these and similar binders. The elastomeric, virtually isocyanate-free, linear polyester-urethanes which are soluble in a volatile organic solvent have proved advantageous. Such polyester-urethanes can be prepared by reacting a polyester (obtained from an aliphatic dicarboxylic acid of 4 to 6 carbon atoms, eg. adipic acid, and one or more aliphatic diols of 3 to 10 carbon atoms, eg. propylene 1,2-glycol, propylene 1,3-glycol, butane-1,4-diol, diethylene glycol, neopentylglycol or octane-1,8-diol) with a diisocyanate of 6 to 24, in particular 8 to 20, carbon atoms, eg. toluylene diisocyanate or 4,4'-diisocyanatodiphenylmethane, preferably in the presence of a relatively small amount of a glycol of 4 to 10 carbon atoms, eg. butane-1,4-diol, which acts as a chain-lengthening agent. Preferred polyester-urethanes are those obtained from adipic acid, butane-1,4-diol and 4,4'-diisocyanatodiphenylmethane, and having a Shore hardness A of from 70 to 100, a tensile strength of from 400 to 420 kp/cm$^2$ and an elongation at break of about 200–560%. Other very useful polymer binders are those based on a copolymer of from 70 to 95, in particular from 75 to 90, % by weight of vinyl chloride and from 5 to 30, in particular from 10 to 25, % by weight of an alkyl ester of an olefinically unsaturated carboxylic acid of 3 to 5 carbon atoms, eg. acrylic acid, methacrylic acid or maleic acid, where alkyl is preferably of 1 to 3 carbon atoms. The corresponding vinyl chloride copolymers with one or more di-C$_1$-C$_3$-alkyl maleates, eg. copolymers of from 70 to 90% by weight of vinyl chloride, from 5 to 15% by weight of dimethyl maleate and from 5 to 15% by weight of diethyl maleate, should be singled out. Particularly suitable copolymers have a K value (according to H. Fikentscher, Cellulose-Chemie 30 (1931), 58 et seq.) of from 40 to 90.

To prepare the dispersion, the material treated according to the invention, the other materials and the solution of the binder are mixed with the dispersant, the lubricant and other conventional additives, and the mixture is introduced into a dispersing apparatus, eg. a tubular ball mill or a stirred ball mill. The resulting dispersion is filtered, and, using a conventional coating apparatus, eg. a knife coater, is then applied, in one or more thin layers, to the non-magnetic base, or is applied, in a thin layer, to a magnetic recording medium already provided with another magnetic layer. As a rule, the anisotropic magnetic particles in the applied layer are then oriented magnetically before the fluid coating mixture on the base is dried, a procedure which is advantageously carried out for about 2–5 minutes at about 50°–90° C. in the case of coatings on thermoplastic bases, eg. films. By passing the resulting coated base between heated and polished rollers, preferably at about 60°–80° C., the magnetic layer can be smoothened and compressed. The magnetic layer is in general from 3 to 20, in particular from 4 to 15, $\mu m$ thick.

Magnetic recording media produced using the novel chromium dioxide exhibit a particularly homogeneous and uniform magnetic coating. This is the case particularly where mixtures of the chromium dioxide with other magnetic materials or other fillers are used.

The Examples which follow illustrate the invention. Parts and percentages are by weight, unless stated otherwise, and parts by volume bear the same relation to parts by weight as the liter to the kilogram.

COMPARATIVE EXPERIMENT 1

A chromium dioxide was prepared as described in Example 5A of German Published Application DAS No. 1,270,538, using $Sb_2O_3$ and acicular $Fe_2O_3$.

(a) The reaction product had a pH of 2.4.

(b) When this material was heated in the air at 220° C. in a manner similar to that described in Example 4 of German Published Application DAS 1,905,584, the pH was 2.3.

(c) When the treatment described in (b) was carried out at 340° C. in a stream of 50 liters (S.T.P.)/hour of air, the pH was 2.1.

(d) After the material obtained as described in (c) had been washed and dried, the pH was 2.5.

(e) When the $CrO_2$ obtained in (b) was stabilized as described in Example 31 of German Published Application DAS No. 1,925,541, but using 8% by weight of sodium sulfite, the pH was 2.1.

(f) When the $CrO_2$ obtained in (a) was heated in a stream of 50 liters (S.T.P.)/hour of nitrogen for 5 hours at 340° C., as described in European Laid-Open Application No. 029,687, the pH was 2.3.

(g) When a $CrO_2$ doped with 1.7% of Fe and 0.09% of Te was prepared as described in Examples 8 to 10 of German Published Application DAS No. 2,648,305, the pH was 2.2.

(h) When the $CrO_2$ obtained as described in (g) was stabilized as described in (e), the pH was 2.2.

COMPARATIVE EXPERIMENT 2

A chromium dioxide was prepared as described in Example 5A of German Published Application DAS No. 1,270,538, using $Sb_2O_3$ and acicular $Fe_2O_3$, and was heated in the air at 270° C. in a manner similar to that described in Example 4 of German Published Application DAS No. 1,905,584. The pH of the material was then 2.2.

250 g of this $CrO_2$ were dispersed in 2.5 liters of water in a beaker, and a solution of 20 g of $Na_2SO_3$ in 100 ml of water was added dropwise to the stirred dispersion in the course of 5 minutes. The pH of the suspension was 8.6. Stirring was continued for a further 15 minutes, after which the pH was 7.0. After the $CrO_2$ (sample 2.1.) had been filtered off, washed with water and dried, it had the pH shown in the Table.

Sample 2.2.: When the addition of sulfite was complete, the pH was brought to 10 with NaOH, and this pH was maintained during the 15-minute period of stirring.

Sample 2.3.: As for sample 2.2., except that the pH was brought to 11.

Sample 2.4.: As for sample 2.2., except that the pH was brought to 12.

TABLE 1

| | pH of the $CrO_2$ powder Drying at | |
|---|---|---|
| $CrO_2$ Sample | 50° C. under reduced pressure from a waterpump (24 hours) | 130° C. in a stream of 30 L (S.T.P.)/hour of air; duration: 75 minutes |
| 2.1. | 2.3 | 2.0 |
| 2.2. | 2.8 | 2.5 |
| 2.3. | 3.6 | 2.2 |
| 2.4. | 3.4 | 2.2 |

EXAMPLE 1A

A chromium dioxide was prepared as described in Example 5A of German Published Application DAS No. 1,270,538, using $Sb_2O_3$ and acicular $Fe_2O_3$, and was heated at 270° C. in the presence of air, in a manner similar to that described in Example 4 of German Pat. No. 1,905,584. The pH of the sample was then 2.4.

250 g portions of this $CrO_2$ sample were then treated as follows:

Sample A (comparison): As for sample 2.3. in Comparative Experiment 2; 8% by weight of $Na_2SO_3$.

Sample B: 250 g of $CrO_2$ were dispersed in 2.5 liters of water in a beaker. A solution of 100 ml of water and 15 g of $NaSO_3$ (6% by weight) was added dropwise to the stirred dispersion in the course of 5 minutes, after which a solution of 22.75 g of $FeSO_4.7H_2O$ (=1.83% by weight of Fe(II)) in 100 ml of water was added dropwise, likewise in the course of 5 minutes. The pH was then brought to 11 with NaOH, and this pH was maintained constant during the 15-minute period of stirring. Thereafter, the mixture was filtered and the filter cake was washed with water and then dried at 45° C. under reduced pressure from a waterpump.

Sample C: The procedure employed was as described under B, except that the following amounts were used: 11.6 g (4.63% by weight) of $Na_2SO_3$ and 37.5 g of $FeSO_4.7H_2O$ (=3% by weight of Fe(II)).

Sample D: The procedure employed was as described under B, except that the following amounts were used: 7.35 g (2.94% by weight) of $Na_2SO_3$ and 63.25 g of $FeSO_4.7H_2O$ (=5.08% by weight of Fe(II)).

Sample E (comparison): The treatment was carried out as described under B, except that a solution of 90 g of $FeSO_4.7H_2O$ (=7.2% by weight of Fe(II)) in 150 ml of water was used and sodium sulfite was not added.

The results are shown in Table 2.

EXAMPLE 2

The starting material used was a $CrO_2$ as described in Example 1A.

Sample F: 250 g of this $CrO_2$ were dispersed in 2.5 liters of water in a beaker provided with a glass electrode. A solution of 22.6 g (4.63% by weight) of $Na_2SO_3$ in 100 ml of water and a solution of 37.5 g of $FeSO_4.7H_2O$ [=3% by weight of Fe(II)] in 100 ml of water were simultaneously added dropwise to the stirred suspension in the course of 5 minutes. In order to keep the pH of the suspension of about 4.5–5.5, a third aqueous solution, ie. 12% strength sodium hydroxide solution, was also added dropwise. When the addition was complete, dispersing was continued for a further 5 minutes, the pH being kept above 4 with NaOH. The pH was then brought to 11 with 25% strength NaOH, and dispersing was continued for a further 5 minutes. Filtration, washing and drying were carried out as described for sample B in Example 1.

Sample G: 130 g of $CrO_2$ were dispersed in 1,300 ml of water in a beaker provided with a glass electrode. 6.02 g (4.63% by weight) of $Na_2SO_3$ in 75 ml of water and 19.5 g of $FeSO_4.H_2O$ (3% by weight of Fe(II)) in 75 ml of water were simultaneously added dropwise to the stirred dispersion in the course of 5 minutes. At the same time, the pH was kept at 7 with a third solution, ie. an aqueous 12% strength sodium hydroxide solution. When the addition of the three solutions was complete, dispersing was continued for a further 5 minutes at pH 7. The pH was then brought to 11 with 25% strength NaOH, and dispersing was continued for a further 5 minutes. Sample G was worked up by the procedure described for F.

Sample H: The procedure was as described for sample G, except that the pH was kept at 9 during the addition of the three solutions.

Sample I: The procedure was as described for sample G, except that the pH was brought to 11 at as early a stage as the addition of the three solutions.

The results are shown in Table 2.

EXAMPLE 1B

Portions of 90 parts of $CrO_2$ samples A to I, together with 2.5 parts of zinc oleate, 30 parts of a 20% strength solution of a copolymer of 80 parts of vinyl chloride and 20 parts of a maleate in a 1:1 mixture of tetrahydrofuran and dioxane, and 57 parts of the stated solvent mixture, were introduced into a stirred mill having a capacity of 0.6 liter. 1.8 kg of steel balls having a diameter of 3–4 mm were added, and the mixture was then homogenized for 2 hours. Thereafter, 108 parts of a 13% strength solution of a polyurethane based on adipic acid, butanediol and diphenylmethyl 4,4'-diisocyanate in a 1:1 mixture of tetrahydrofuran and dioxane, as well as 0.09 part of a silicone oil and 32 parts of the 1:1 mixture of tetrahydrofuran and dioxane, were added to the dispersion. The dispersion was then treated for a further hour, after which it was filtered and then cast on a 12 μm polyester film by means of a knife coater, and the layer was dried and then calendered at 80° C. The magnetic properties of the individual magnetic layers are shown in Table 2.

EXAMPLE 3

The starting material used was a $CrO_2$ as described in Example 1A, and having a higher coercive force as a result of being doped differently.

1 kg of this $CrO_2$ was dispersed in 10 liters of water in a vessel. The pH of the suspension was 2.4. A solution of 80 g (8% by weight) of $Na_2SO_3$ in 500 ml of water was then added dropwise to the stirred dispersion in the course of 5 minutes, as a result of which the pH of the suspension increased to 8.1. A solution of 199.2 g of $FeSO_4.7H_2O$ (4% by weight of Fe(II)) in 500 ml of water was then added in the course of 5 minutes, while stirring was continued. In order to avoid an excessively acidic pH, NaOH was added at the same time to keep the pH at 4.6–6.0. After the addition of the Fe(II) solution was complete, stirring was continued for a further 3 minutes. The pH of the suspension was brought to 10.5 with NaOH, while stirring was continued. Some of the suspension (corresponding to 30 g of solid $CrO_2$) was then removed and filtered, and the residue was washed with water and dried in a cabinet dryer at from 40° to 50° C. under reduced pressure from a waterpump (sample K: Hc=53.9; Mm/ρ=62; Mr/ρ=36). The remaining suspension was brought to pH 11 with NaOH, and another sample was removed and worked up as in the case of K (sample L: Hc=54.0; Mm/ρ=63; Mr/ρ=37).

The pH was brought to 12, after which the remaining suspension (corresponding to 940 g of $CrO_2$) was worked up as in the case of sample K (sample M: Hc=54.5; Mm/ρ=62; Mr/ρ=37).

10 g portions of sample M were then heated in a stream of 30 liters (S.T.P.)/hour of air or nitrogen for 75 minutes at the temperatures shown in Table 3, in a rotating flask, and the pH was then determined.

The samples are compared, in respect of pH, with the $CrO_2$ samples K, L and M after these had been dried at 40°–50° C. under reduced pressure from a waterpump.

| Sample | Drying conditions | pH of the $CrO_2$ in air | dried in an $N_2$ stream |
|---|---|---|---|
| K | 40–50° C. under reduced | 7.3 | — |
| L | 40–50° C. pressure from | 7.2 | — |
| M | 40–50° C. a waterpump | 6.8 | — |
|   | 80° C. | 6.1 | 5.0 |
|   | 100° C. | 4.8 | 4.2 |

TABLE 2

| Sample | % by weight, based on $CrO_2$ $Na_2SO_3$ | Fe(II) | pH of $CrO_2$ | $S_{N_2}$ [m²/g] | Magnetic properties of the powder Hc | Mm/ρ | Mr/ρ | Magnetic tape properties Hc [A/m] | Mm¹ [mT] | Mr² | $\frac{Mr^3}{Mm}$ | Orientation ratio |
|---|---|---|---|---|---|---|---|---|---|---|---|---|
| starting material | — | — | 2.4 | 25.0 | 47.6 | 85 | 48 | — | — | — | — | — |
| A | 8 | — | 3.6 | 28.1 | 46.4 | 78 | 43 | 47.0 | 189 | 167 | 0.88 | 3.1 |
| B | 6 | 1.83 | 4.5 | 31.9 | 48.7 | 77 | 44 | 48.0 | 214 | 188 | 0.88 | 3.2 |
| C | 4.63 | 3.0 | 5.6 | 35.9 | 49.2 | 73 | 41 | 48.7 | 182 | 159 | 0.87 | 3.0 |
| D | 2.94 | 5.08 | 6.1 | 40.9 | 49.3 | 68 | 39 | 49.8 | 174 | 146 | 0.84 | 2.3 |
| E | — | 7.2 | 6.4 | 40.9 | 49.8 | 67 | 38 | 49.9 | 159 | 126 | 0.79 | 1.8 |
| F | 4.63 | 3.0 | 5.5 | 31.0 | 49.1 | 73 | 42 | 48.5 | 186 | 163 | 0.88 | 3.0 |
| G | pH 4.5–5.5 4.63 | 3.0 | 5.1 | 31.7 | 50.0 | 73 | 41 | 48.3 | 169 | 145 | 0.86 | 2.6 |
| H | pH = 7 4.63 | 3.0 | 5.2 | 32.8 | 49.7 | 75 | 42 | 48.4 | 200 | 173 | 0.87 | 2.8 |
| I | pH = 9 4.63 | 3.0 | 5.2 | 32.3 | 49.7 | 43 | 43 | 48.4 | 179 | 156 | 0.87 | 2.7 |

[1]Mm = saturation magnetization
[2]Mr = remanence
[3]$\frac{Mr}{Mm}$ = relative remanence -continued

| Sample | Drying conditions | pH of the CrO$_2$ in air | dried in an N$_2$ stream |
|---|---|---|---|
| | 130° C. | 4.3 | 3.2 |
| | 150° C. | 2.8 | 2.9 |
| | 170° C. | 3.0 | — |
| | 190° C. | 2.8 | 3.0 |
| | 210° C. | 2.7 | 2.7 |

EXAMPLE 4

The starting material used was a CrO$_2$ as described in Example 1.

200 g portions of this chromium dioxide (sample N1) were dispersed in 2 liters of water in a vessel. A solution of 3.12 g (1.56% by weight) of Na$_2$SO$_3$ in 50 ml of water was added dropwise in the course of 5 minutes to the stirred dispersion. Thereafter, a solution of 41.75 g of FeCl$_2$.4H$_2$O (5.8% of Fe(II)) in 100 ml of water was added in the course of 5 minutes while stirring was continued. With the aid of a 12% strength aqueous sodium hydroxide solution, the pH was kept at 3.5 during the addition of the Fe(II). After the addition of the Fe(II) was complete, the pH of the suspension was increased to 10, and this pH was also maintained during the 5-minute period of stirring.

The suspension was then filtered, the residue was washed with water until the filtrate was chloride-free, and the filter cake was dried at 50° C. under reduced pressure from a waterpump (sample N 2). The pH of the sample was then 6.3. The properties of the powder are shown in Table 3.

TABLE 3

| Sample | Hc | Mm/ρ | Mr/ρ | pH |
|---|---|---|---|---|
| N 1 | 26.3 | 95 | 43 | 2.4 |
| N 2 | 25.5 | 79 | 38 | 6.3 |

EXAMPLE 5

The starting material used was a CrO$_2$ as described in Example 1. The properties of this chromium dioxide (sample 01) are shown in Table 4.

Some of this sample was stabilized with 8% by weight of Na$_2$SO$_3$, using the procedure described in Example 31 of German Published Application DAS No. 1,925,541. The properties are shown in Table 4.

1,500 g of CrO$_2$ sample 01 in 15 liters of water were treated with a solution of 69.45 g (4.63% by weight) of Na$_2$SO$_3$ in 500 ml of water and a solution of 225 g of FeSO$_4$.7H$_2$O (=3% by weight of Fe(II)) in 500 ml of water, using the procedure described for sample F in Example 2. The properties measured on this material (sample 03) are shown in Table 4.

A further 1,500 g of CrO$_2$ were reacted as described above, except that 4.63% by weight of Na$_2$SO$_3$ and 6% by weight of Fe(II) were used. The product was then worked up (sample 04).

EXAMPLE 7

A chromium dioxide was prepared as described in Example 5A of German Published Application DAS 1,270,538, using Sb$_2$O$_3$ and acicular Fe$_2$O$_3$, and was heated first for 75 minutes at 220° C. and then for 2 hours at 280° C. in the presence of air, in a manner similar to that described in Example 4 of German Published Application DAS No. 1,905,584 (sample R 1).

1.7 kg of the CrO$_2$ sample R 1 were dispersed in 17 liters of water, and the 3 solutions below were simultaneously added dropwise to the stirred dispersion in the course of 5 minutes:

Solution 1: 136 g (8% by weight) of Na$_2$SO$_3$ dissolved in 1 liter of water

Solution 2: 677.56 g of FeSO$_4$.7H$_2$O (8% by weight of Fe(II)) dissolved in 1.3 liters of water Solution 3: 25% strength aqueous NaOH.

With the aid of solution 3, the pH of the suspension was kept just above 4. When the addition of solutions 1 and 2 was complete, dispersing was continued for a further 5 minutes. Thereafter, the pH was brought to 11 with solution 3, and stirring was continued for a further 5 minutes. The suspension was then filtered, the residue was washed with water and the washed filter cake was dried at from 40° to 50° C. under reduced pressure from a waterpump (sample R 2).

The results of the measurements are shown in Table 5.

TABLE 5

| Sample | Na$_2$SO$_3$ | Fe(II) | pH | Hc | Mm/ρ | Mr/ρ |
|---|---|---|---|---|---|---|
| R 1 | — | — | 2.2 | 47.1 | 86 | 49 |
| R 2 | 8 | 8 | 6.6 | 50.2 | 66 | 38 |

EXAMPLE 8

A chromium dioxide was prepared as described in Example 5A of German Published Application DAS 1,270,538, using Sb$_2$O$_3$ and acicular Fe$_2$O$_3$, and was heated at 270° C. for 3 hours in the presence of air, in a manner similar to that described in Example 4 of German Published Application DAS No. 1,905,584 (sample S 1).

950 g of the CrO$_2$ sample S 1 were dispersed in 9.5 liters of water. A solution of 76 g (8% by weight) of Na$_2$SO$_3$ in 500 ml of water was added to the stirred dispersion in the course of 6 minutes, after which a solution of 379 g of FeSO$_4$.7H$_2$O (8% by weight of Fe(II)) in 1 liter of water was added dropwise in the course of 6 minutes. Stirring was then continued for a further 5 minutes, after which the pH of the suspension was brought to 11 with dilute aqueous sodium hydroxide solution. The suspension was then filtered, and the filter cake was washed with water and dried for 36 hours at 45° C. under reduced pressure from a waterpump (sample S 2).

TABLE 4

| Sample | Na$_2$SO$_3$ % by weight | Fe(II) from FeSO$_4$.7H$_2$O % by weight | Properties of the CrO$_2$ powder | | | |
|---|---|---|---|---|---|---|
| | | | pH | Hc | Mm/ρ | Mr/ρ |
| 01 | none | none | 2.4 | 47.6 | 85 | 48 |
| 02 | 8 | none | 2.5 | 45.2 | 76 | 42 |
| 03 | 4.63 | 3 | 5.4 | 49.6 | 72 | 41 |
| 04 | 4.63 | 6 | 6.4 | 50.6 | 63 | 36 |

TABLE 6

| Sample | Na$_2$SO$_3$ % by weight | Fe(II) % by weight | Properties of the CrO$_2$ powder | | |
|---|---|---|---|---|---|
| | | | pH | Hc | Mm/ρ | Mr/ρ |
| S 1 | — | — | 2.8 | 52.1 | 81 | 48 |
| S 2 | 8 | 8 | 9.3 | 56.2 | 57 | 34 |

EXAMPLE 9

CrO$_2$ which was prepared as described in Examples 8 to 10 of German Published Application DAS No. 2,648,305 and was doped with 1.7% of Fe and 0.09% of Te had a pH of 2.2 (sample T 1).

Some of sample T 1 (90 g) was stabilized with 8% by weight of Na$_2$SO$_3$, using a procedure described in Example 31 of German Published Application DAS No. 1,925,541 (sample T 2).

A further 90 g of CrO$_2$ sample T 1 were worked up with Na$_2$SO$_3$ (4.63% by weight) and FeSO$_4$.7H$_2$O (3% by weight of Fe(II)), using the procedure described in Example 7 (sample T 3).

The results of the measurements are shown in Table 7.

TABLE 7

| Sample | Na$_2$SO$_3$ % by weight | Fe(II) % by weight | Properties of the powder | | |
|---|---|---|---|---|---|
| | | | pH | Hc | Mm/ρ | Mr/ρ |
| T 1 | — | — | 2.2 | 53.4 | 77 | 39 |
| T 2 | 8 | — | 2.2 | 54.9 | 74 | 36 |
| T 3 | 4.63 | 3 | 5.1 | 57.9 | 69 | 38 |

EXAMPLE 10

50 parts of a CrO$_2$ pigment prepared by a conventional method and having a pH of 2.5 and an Hc value of 48 kA/m, 1.25 parts of zinc oleate, 71.1 parts of a 12.5% strength polyurethane solution in a 1:1 mixture of tetrahydrofuran and dioxane, 11.1 parts of a 20% strength phenoxy resin solution, 1.0 part of butyl stearate, 0.25 part of stearic acid and 58.85 parts of the 1:1 mixture of tetrahydrofuran and dioxane were introduced into a glass flask which had a capacity of 0.25 liter and contained 0.43 kg of steel balls of 4–6 mm diameter. The glass flask was then clamped in a shaker, and was shaken for 3 hours. The dispersion was then separated from the balls by filtration. The coatings produced from the dispersion using a manual coater showed hardly any projections and agglomerates. The average peak-to-valley height of the surface was 0.8.

EXAMPLE 11 (Comparison)

The procedure described in Example 10 was followed, except that the zinc oleate was replaced with the basic dispersant sodium oleate. The coatings produced from the dispersion with the manual coater showed large projections and a large number of agglomerates. The average peak-to-valley height was greater than 1.5.

EXAMPLE 12 (Comparison)

The procedure described in Example 10 was followed, except that the chromium dioxide employed was prepared as described in Example 8, sample S 2, and had a pH of 9.3 and an Hc value of 56.2 kA/m. The coatings produced with the manual coater showed a large number of large projections. The average peak-to-valley height was greater than 0.2.

EXAMPLE 13

The procedure described in Example 12 was followed, except that the basic compound sodium oleate was employed as a dispersant. The coatings produced from the dispersion with the manual coater were virtually free of projections and had an average peak-to-valley height of less than 0.8. Photographs taken in oblique light showed that the coatings were very homogeneous.

EXAMPLE 14

450 parts of a chromium dioxide which was obtained as described for sample M in Example 3 and whose powder ha an Hc value of 54.5 kA/m and a pH of 6.8, 450 parts of iron particles prepared as described in German Laid-Open Application DOS No. 2,646,348 and having an Hc value of 73.2 kA/m and a pH of 8.9, 22.5 parts of sodium oleate, 640 parts of a 12.5% strength polyurethane solution, 100 parts of a 20% strength phenoxy resin solution and 850 parts of a 1:1 mixture of tetrahydrofuran and dioxane were mixed in a ball mill having a capacity of 6 liters and containing 8 kg of steel balls of 4–6 mm diameter. The contents were then milled in the ball mill for 210 hours, after which a further 640 parts of the 12.5% strength polyurethane solution, 100 parts of the above phenoxy resin solution, 9 parts of butyl stearate, 4.5 parts of stearic acid and 200 parts of the above solvent mixture were added to the dispersion and dispersing was carried out for 24 hours. Magnetic tapes having a 4 μm thick layer were then produced in a conventional manner from the resulting dispersion. The Hc value was 64.4 kA/m and the remanence was 193 mT.

EXAMPLE 15

Using the procedure described in Example 14, a dispersion was prepared from 630 parts of a cobalt-doped iron oxide having an Hc value of 54.5 kA/m and a pH of 8.0, as well as from a CrO$_2$ obtained as described for sample 04 in Example 5 and having a pH of 6.4. The dispersing time was 65 hours in the initial phase and 24 hours in the subsequent phase. When the experiment was repeated with a more acidic CrO$_2$ pigment (pH=2.5), the dispersing times required were 120 hours in the initial phase and 24 hours in the subsequent phase.

EXAMPLE 16

60 parts of a γ—Fe$_2$O$_3$ were prepared as described in German Published Application DAS No. 1,204,644 and having an Hc value of 28.5 kA/m and a pH of 9.6, 60 parts of a CrO$_2$ obtained as described for sample N 2 in Example 4, 7.2 parts of a dispersant based on a mixture of a monophosphoric acid ester with a salt of a sulfosuccinic acid, 30 parts of a 20% strength solution of a vinyl chloride/alkyl maleate copolymer in a 1:1 mixture of tetrahydrofuran and dioxane, 30.7 parts of a 12.5% strength polyurethane solution, likewise in the stated solvent mixture, and 69.2 parts of this solvent mixture were dispersed for 2 hours in a stirred ball mill having a capacity of 0.6 liter and containing 1.8 kg of steel balls of 4–6 mm diameter. Thereafter, 76.9 parts of the above polyurethane solution, 53.3 parts of the stated solvent mixture, 1.2 parts of stearic acid, 0.24 part of butyl stearate, 0.24 part of hydroquinone and 0.12 part of a silicone oil were added to the dispersion, and the mixture was milled in the ball mill for one hour. The resulting dispersion was very homogeneous. The magnetic tapes produced in a conventional manner with this dispersion had an Hc value of 25.9 kA/m, a remanence of 173 mT, an orientation ratio of 2.7 and an average peak-to-valley height of 0.37.

EXAMPLE 17

630 parts of the $CrO_2$ pigment R 2 from Example 7 and 270 parts of a hexagonal ferrite of the formula $BaCoTiFe_{10}O_{19}$, having an Hc value of 23 kA/m, a specific remanence of 22 $nTm^3/g$ and a pH of 9.4, were processed together with the additives described in Example 14 and by the method described in that Example to give magnetic tapes. The 3.8 μm thick magnetic layer had an Hc of 47.7 kA/m, a remanence of 97 mT, an orientation ratio of 1.8 and an average peak-to-valley height of 0.2.

We claim:

1. Acicular ferromagnetic chromium dioxide particles having a pH greater than 4, said particles having been prepared by suspending acicular ferromagnetic chromium dioxide particles in water, adding an aqueous solution of an alkali metal sulfite or bisulfite and an aqueous solution of an iron (II) salt to the particle suspension, at a temperature of from 10° to 70° C., maintaining the pH of the suspension at from 4 to 11 by adding additional base to the suspension and thereafter separating the solid particles from the suspension, washing the particles with water and drying the particles at a temperature below 130° C.

2. A process for the preparation of acicular ferromagnetic chromium dioxide particles as set forth in claim 1, wherein acicular ferromagnetic chromium dioxide particles are suspended in water, an aqueous solution of an alkali metal sulfite or bisulfite and an aqueous solution of an iron(II) salt are added at from 10° to 70° C. and the solid is separated off from the water, washed with water and dried at below 130° C.

3. A process as set forth in claim 2, wherein the pH of the aqueous suspension of the chromium dioxide particles is brought to 4–11 with a base.

4. A process as set forth in claim 2, wherein drying is carried out in an inert gas atmosphere at below 100° C.

* * * * *